(12) United States Patent
Zhang et al.

(10) Patent No.: US 10,797,939 B2
(45) Date of Patent: Oct. 6, 2020

(54) WAN CONTROL FAILOVER BROKER FOR VHGW

(71) Applicants: Koninklijke KPN N.V., Rotterdam (NL); Nederlandse Organisatie Voor Toegepast—Natuurwetenschappelijk Onderzoek TNO, s-Gravenhage (NL)

(72) Inventors: Shuang Zhang, Delft (NL); Frank Den Hartog, Melba (AU); Miodrag Djurica, Rotterdam (NL)

(73) Assignees: Koninklijke KPN N.V., Rotterdam (NL); Nederlandse Organisatie Voor Toegepast-Natuurwetenschappelijk Onderzoek TNO, The Hague (NL)

( * ) Notice: Subject to any disclaimer, the term of this patent is extended or adjusted under 35 U.S.C. 154(b) by 0 days.

(21) Appl. No.: 15/507,180

(22) PCT Filed: Sep. 1, 2015

(86) PCT No.: PCT/EP2015/069932
§ 371 (c)(1),
(2) Date: Feb. 27, 2017

(87) PCT Pub. No.: WO2016/034575
PCT Pub. Date: Mar. 10, 2016

(65) Prior Publication Data
US 2017/0279664 A1    Sep. 28, 2017

(30) Foreign Application Priority Data
Sep. 5, 2014   (EP) .................................... 14183825

(51) Int. Cl.
*H04L 12/24*   (2006.01)
*H04L 12/707*  (2013.01)
(Continued)

(52) U.S. Cl.
CPC .......... *H04L 41/0663* (2013.01); *H04L 12/28* (2013.01); *H04L 12/283* (2013.01); *H04L 45/22* (2013.01); *H04L 45/28* (2013.01)

(58) Field of Classification Search
None
See application file for complete search history.

(56) References Cited

U.S. PATENT DOCUMENTS 7,257,565 B2    8/2007  Brill
9,173,117 B2 *  10/2015 Haddad ................. H04W 24/04
(Continued)

FOREIGN PATENT DOCUMENTS

EP       1 901 497 A1      3/2008
WO    WO 2013/054260 A1    4/2013
(Continued)

OTHER PUBLICATIONS

Abgrall, D., et al., "Virtual Home Gateway How Can Home Gateway Virtualization be Achieved?," Retrieved from the Internet: URL: http://archive.eurescom.eu/pub-deliverables/P2000-series/P2055/D1/P2055-D1.pdf, EDIN 0599-2055, Study P2055, (Sep. 2011).

(Continued)

*Primary Examiner* — Saba Tsegaye
(74) *Attorney, Agent, or Firm* — Hamilton, Brook, Smith & Reynolds, P.C.

(57) ABSTRACT

The invention relates to a node for communication between a first network and an second network and coupled to a controller in the second network via a first communication route. The node and controller form a virtualised home gateway platform. The node is arranged to access a second communication route and also to couple to the controller via the second communication route upon connection failure of the first communication route. This reconnects the node to (Continued)

Figure 1:
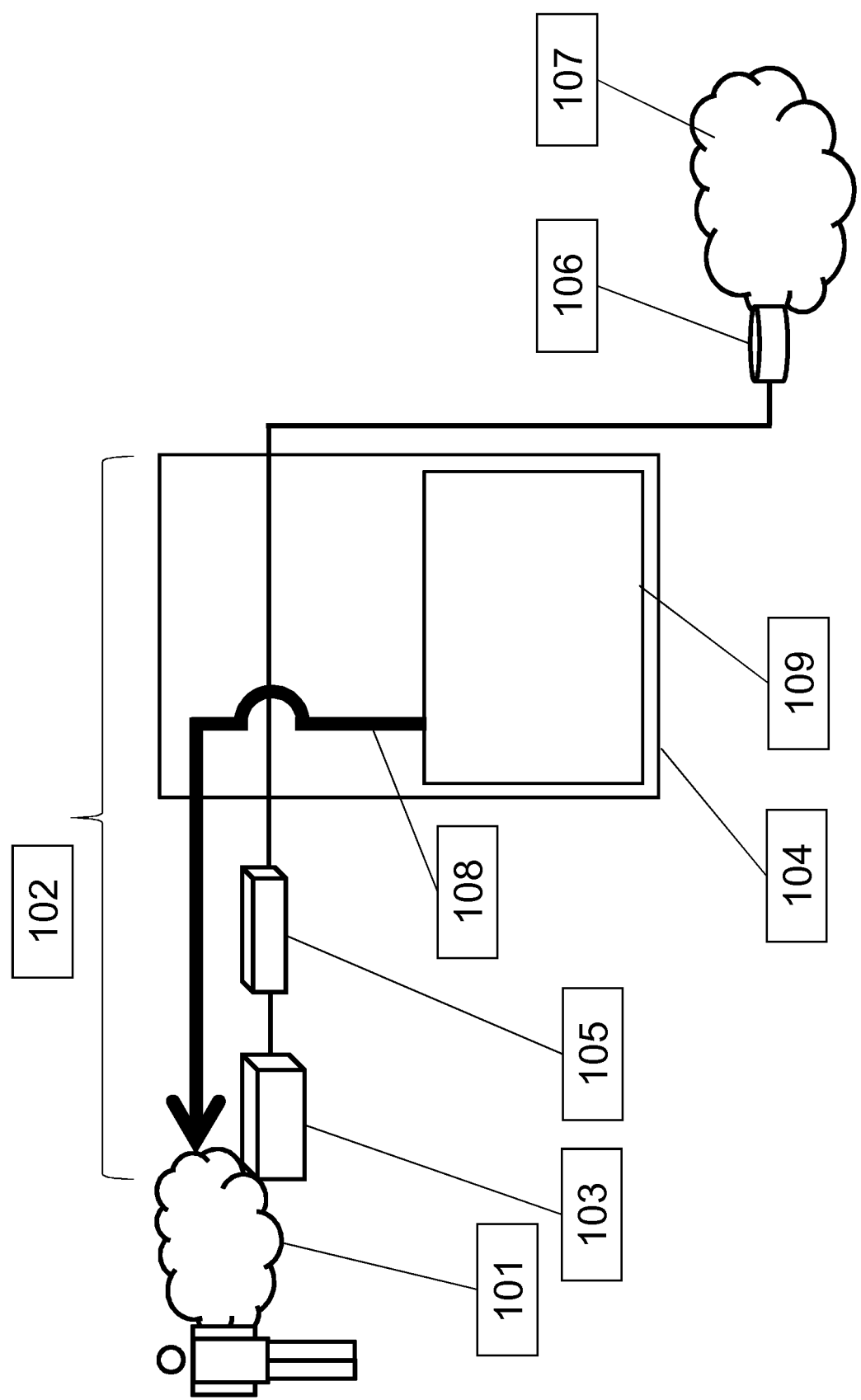

the controller thereby maintaining a route for transmission of data streams and downloads into the home environment but also re-establishes control signalling within the virtualised home gateway platform and therefore also within the home network. A system for performing gateway functions between a first network and an second network, and a method of maintaining connection between a node and a controller, are also described.

15 Claims, 7 Drawing Sheets

(51) Int. Cl.
*H04L 12/28* (2006.01)
*H04L 12/703* (2013.01)

(56) References Cited

U.S. PATENT DOCUMENTS

| | | | |
|---|---|---|---|
| 9,860,111 B2 | 1/2018 | Kerpez et al. | |
| 2005/0086371 A1* | 4/2005 | Jung | H04L 63/0272 709/242 |
| 2008/0069106 A1* | 3/2008 | Tokumoto | H04L 45/00 370/392 |
| 2009/0021222 A1* | 1/2009 | Kudo | B60L 58/22 320/160 |
| 2009/0066789 A1 | 3/2009 | Baum et al. | |
| 2011/0216646 A1 | 9/2011 | Flinta et al. | |
| 2011/0310900 A1* | 12/2011 | Motoyama | H04L 12/2818 370/392 |
| 2014/0126356 A1* | 5/2014 | Lee | H04L 41/0663 370/228 |
| 2014/0226642 A1* | 8/2014 | Haddad | H04W 40/02 370/338 |
| 2015/0109903 A1* | 4/2015 | Nasir | H04L 41/5074 370/221 |

FOREIGN PATENT DOCUMENTS

| | | |
|---|---|---|
| WO | WO 2013/085485 A1 | 6/2013 |
| WO | WO 2014/177970 A1 | 11/2014 |

OTHER PUBLICATIONS

"CD1 15045-01: Information technology—Interconnection of information technology equipment—Architecture for HomeGate, the residential gateway (AHRG)" in Interconnection of Information of Information Technology Equipment Home Electronic System, ISO/IEC JTC 1/SC 25/WG 1; Dated: Apr. 1, 2000, 40 Pages.
"Dual Wan and gateways (actually 3 gateways possible???)" from DSL Reports, 3pages as downloaded on Jun. 2, 2017 from http://www.dslreports.com/forum/r27885850-Dual-Wan-and-gateways-actually-3-gateways-possible.
Knutsson, B., et al., "IK2209—Communication System Design Final Report Multi-homed Residential Gateway," MISP KTH, Dated: Oct. 22, 2007, 22 Pages.
Notification of Transmittal of the International Search Report and The Written Opinion of the International Searching Authority, or the Declaration for PCT/EP2015/069932, entitled WAN Control Failover Broker for VHGW, dated Nov. 4, 2015.
Wikipedia, "Internet Service Provider," pp. 1-6 May 18, 2020.
Communication Pursuant to Article 94(3) EPC for EP Application No. 15763246.4, (6 pages) dated May 29, 2020.

* cited by examiner

WAN CONTROL FAILOVER BROKER FOR VHGW

This application is the U.S. National Stage of International Application No. PCT/EP2015/069932, filed Sep. 1, 2015, which designates the U.S., published in English, and claims priority under 35 U.S.C. §§ 119 or 365(c) to Europe Application No. 14183825.0, filed Sep. 5, 2014. The entire teachings of the above applications are incorporated herein by reference.

The invention relates to a node for communication between a first network and a second network, a system for performing gateway functions between a first network and a second network and a method of maintaining connection in a distributed gateway situated functionally between a first network and a second network.

BACKGROUND

Small, localised networks have become increasingly common in the domestic or home environment. Frequently referred to as home networks, these are typically connected to the wider internet via a home gateway (HGW), hitherto a device acting as a funnel for all traffic into and out of the home network. Typically the home gateway linked the home network directly to an operator network providing internet services, and frequently additional TV and radio services, to the occupants of the home.

However home networks have become more complicated and with it the home gateway itself has become correspondingly more complicated to set up and maintain by the home user. In order to improve smooth working of the data transfer between the operator network and the home network a virtualisation of the home gateway has been developed, which transfers some functionality of the home gateway to the operator network.

The virtualisation of a home gateway enables the slimming down of a home gateway into a simplified bridge (BRG), sometimes referred to as a bridged residential gateway, while shifting aspects of the control, management and AAA protocol functions (authentication, authorisation and accounting protocols) pertaining to the gateway into the operator network. This is described in Eurescom Study Report "Virtual Home Gateway", Eurescom published study result: EDIN 0599-2055, which can be found at http://archive.eurescom.eu/~pub/deliverables/documents/P2000-series/P2055/D1/P2055-D1.pdf.

These shifted functions, previously integrated on a traditional home gateway hardware unit as tightly-coupled components in the HGW architecture, will instead be serving the home network via a wide area network (WAN) connection as installed applications on virtual machines (VMs) from a different geographic location. Because of the separation from the BRG, these functions are now called virtualized functions (VFs) and the new arrangement is sometimes referred to as a virtual home gateway (vHGW), sometimes also referred to as a virtual gateway, or vG.

However following virtualisation of the home gateway a problem occurs if the WAN connection to the home network is lost, because this means a loss of data transfer between the home network and the outside world, through the vHGW.

In order to preserve the connection for data transfer a prior art solution uses a second, or secondary, WAN connection to complement the main, or primary, WAN connection. Under normal conditions, a primary WAN connection from one operator, or internet service provider ISP, is active and used to route the entire network traffic and the secondary connection, which is typically from another ISP, remains inactive. Only when the primary WAN connection fails is the secondary connection activated allowing routing of network traffic through the secondary WAN connection in lieu of the failed primary connection. The newly built up secondary connection re-establishes a route directly to the wider internet for the download of data, bypassing the vHGW and operator whose WAN connection has failed, and means that video streaming, downloads from the Internet etc need not be interrupted by the failure of the primary connection. This prior art solution re-establishes a route for download of data pointing to the internet using a secondary connection which allows the home network to be connected directly to their source.

The secondary WAN connection remains active till the primary connection becomes available once more. The secondary WAN link can be either broadband or a mobile connection, typically 3G, 4G, Wi-Fi hotspot or FON, or other known methods of telecommunication.

To implement this prior art solution home gateway vendors typically use two modules, a monitoring module and a switch-over module, on the slimmed down home gateway device. The monitoring module constantly monitors the state of the primary WAN connection. In the case when either physical or PPP (Point-to-Point Protocol) connection breaks down the monitoring module will inform the home gateway via a system monitor message which triggers the switchover module to activate the secondary WAN for obtaining a backup WAN IP. Even though they are a layer-2 device in the data plane, gateways usually still have a TCP/IP stack, so that they can obtain an IP address, typically for management purposes. In the case when the secondary WAN is implemented using a 3G or 4G dongle, the dongle may also support a TCP/IP stack. The backup WAN IP can be obtained via GGSN/P-GW (PDN-GW) of a mobile telecommunications network. After the switchover, the monitoring module continues to monitor the state of the primary WAN connection. Once the primary WAN connection becomes available, it will trigger the switchover module to deactivate the module for the secondary connection and switch back to the primary WAN connection.

However if the home gateway is virtualized then when the broadband connection fails the overall home gateway falls apart because its two main components become de-coupled from each other. The simplified bridge (BRG) loses not only data connectivity with the WAN but also services from the virtualized functions on the vHGW in the operator network.

It is a problem to maintain services for the home network when contact with the operator or wider interest is lost.

SUMMARY

The problem is solved by a node for communication between a first network and a second network wherein the node is coupled to a controller in the second network via a first communication route, and further wherein the node is arranged to access a second communication route and also further wherein the node is arranged to couple to the controller via the second communication route upon connection failure of the first communication route.

In an embodiment the first network is typically a home network of devices, although it can in fact be any network which connects to a second network via some form of gateway or bridge.

In an embodiment the node is typically a gateway or gateway device. Typically the gateway or gateway device is a stand-alone box inserted at the periphery of the home network but it can also be also be an application run on a device in the home network, for example a computer or laptop, and could also be run from a mobile device or handset coupled to the home network.

In an embodiment the second network is typically an operator network, although this is not necessary and the second network can in fact by any network able to host a controller.

In an embodiment the node or gateway is typically an access point between the first network and the second, or operator, network, for example a simplified bridge, which connects to a controller in the second network. The controller is a computing device which has, besides a network interface to the simplified bridge also a network interface to the wider operator network and the Internet. It acts as a virtual home gateway or some other device or arrangement within the second network which performs virtualised functions for the home gateway. Together the gateway and controller form a virtualised, or distributed, home gateway, i.e. one which is distributed over two or more entities and coupled via tele communication channels, in which key home gateway functionality is performed by the controller and the gateway acts as a portal or bridge to the networked devices in the home which form the bulk of the first, home, network.

In an embodiment the node, or gateway, and controller communicate via a first communication route, which is the pathway through which the second network, possibly an operator, provides services to the first network, but the node also has access to a second communication route. The second communication route is some alternative means of communication which can link, or reconnect, the node back to the wider Internet or to a mobile telecommunications network or some combination of the two.

In an embodiment the second communication route can be a 3G or 4G mobile telecommunications connection via, for example, a dongle or some other connector, or even a connection via a mobile device within the first network itself, for example a mobile phone, or can be a publically available Wi-Fi connection, for example via a hotspot or indeed via some other alternative route through which the node, or gateway, can communicate with the outside world, for example through cable or some other light coupling or sound coupling system. Via these or any other equivalent communications network connection the node can gain access to the outside world in an alternative manner to the first communication route.

In an embodiment, upon failure of the first communication route the node accesses the second communication route and uses it to re-establish connection to the controller. The node uses the alternative communication route to connect, or couple, to the controller via some other communication route through the wider net of electronic and signal connectivity. The signalling route taken may be complicated and may go via servers not part of the second network, nevertheless the route allows the node to signal directly to the controller, that is with the controller as the end point of the communication channel, and vice versa, thus allowing the node and controller to maintain contact with each other. In this sense the route actually taken is transparent to both node and controller. The controller should be configured in a way that allows it to offer the virtual functions to the node over the secondary connection.

In doing so the node itself reconnects up the overall virtualised bridge, in other words the distributed home gateway, when the connection route from the home network back to the second network fails.

Re-establishment of contact within the distributed gateway provides an alternative route for the transfer of data between the home network and the internet, which will continue to flow through the controller but which will now flow into the node, or gateway, and on to the recipient devices via the second communication route. Therefore via the second communication route data streams and downloads from the internet will continue to be served, and they will additionally still be enriched with virtualized functions (VFs) from the controller.

Further, re-establishment of the virtualised gateway via the second communication route also maintains control within the home network itself because it allows a channel through which data, management and control signals can flow from the controller into the first network through the newly reconnected gateway.

Because of virtualisation of the home gateway the once autonomic home network has become dependent on crucial WAN connectivity. Home appliances and devices within the network, for example, may obtain services from the distant virtualized functions (VFs) now resident in the operator network including local IP addresses from a DHCP server which allow them to stay connected with each other within the home network. If the WAN connection back to the operator is lost the DHCP virtualized function in the operator network will no longer serve the home appliances. This causes the devices in the home environment to lose local IP connectivity and one result of this is that the home network environment actually falls apart.

By allowing the gateway, or node, to reach the controller performing virtualized functions (VF) by selecting an alternative backup connection, the home network is prevented from falling apart in the event that the primary connection to the operator, or second network, is lost because the backup channel, the second communication channel, can be used for management and control messaging and other data flows between the gateway, or node, as bridge and the vHGW performing virtualized functions in the operator's network domain.

In this way the uptime of the virtually served home network is also maximized.

In an embodiment the backup channel is typically a full-duplex, bi-directional communication channel, although it is not a requirement.

Services are therefore maintained to the home, including services which are provided within the virtualised home gateway arrangement itself.

In an embodiment the node itself can be arranged to detect connection failure of the first communication route, and executes switchover to the second communication route upon detection of the failure of the first communication route. The node is provisioned accordingly before switchover. In a further embodiment another device in the home network may detect the failure and signal this to the node.

In an embodiment the node is arranged to request an IP address for communicating with the controller in the second network. In this embodiment the stripped-down home bridge (BRG), or gateway, when losing main WAN connection with the network, resorts to a backup IP connection to obtain services from the vHGW instance. These services are now served remotely, in the sense that they no longer come via the main, primary connection between vHGW and node.

In one embodiment the BRG, or node, obtains an IP address from the backup network element, which is used to reroute bidirectional data, control and/or management messages between the vHGW instance and the BRG, to ensure service continuity within the corresponding home network.

Therefore via the backup connection, the BRG obtains an alternative management WAN IP address and this is preferably in the same subnet of the broadband remote access server (BRAS) IP address assigned by P-GW/GGSN, or by WLAN-GW in a hotspot, although this is not a requirement.

By coupling with the controller through the second communication route and arriving at the controller via some other network or communication system the signalling channel set up between the node and controller can bypass the connection failure point that has caused failure of the primary connection route.

In an embodiment the operator or the second network reroutes the data and control signalling on the backup channel via the BRAS appropriate to the first network and the data path remains valid because the primary WAN failure does not affect the connectivity between the vHGW instance and the remainder of the operator, or second, network.

In a particularly advantageous embodiment the node comprises an agent capable of performing the tasks described. Such an agent might be called, for example, a WAN Control Failover Broker (WCFB) and this is arranged to detect connection failure of the first communication route and execute switchover to the second communication route. The WAN Control Failover Broker (WCFB) module is introduced to the node, simplified bridge, or gateway, architecture to enable the selection of the WAN backup channel. This is specifically useful when multiple communication modules are present on the residential gateway (RG). The WAN Control Failover Broker (WCFB) is aware of the various available backup connections on the BRG.

In an alternative embodiment the node comprises a module, for example a specific hardware module, to detect connection failure of the first communication route and execute switchover to the second communication route. Again, this module could be termed, for example, a WAN Control Failover Broker (WCFB) and it performs the appropriate tasks as described.

In an advantageous embodiment the node is arranged to access any further communication routes available and select a preferred communication route as the second communication route. The WCFB listens to any notification from the BRG, or node, that the main WAN connection has failed and considers the possible backup schemes available on the BRG. Upon selection of a backup channel, the WCFB accordingly provisions the BRG conforming to the chosen backup alternative to establish the backup connection.

Advantageously in a particular embodiment the node can select a preferred communication route according to predetermined rules, and further advantageously these can be comprised in a provisioning rules table. The WCFB listens to any notification from the BRG, or node, that the main WAN connection has failed and scans through possible backup schemes available on the BRG through evaluating the switchover criteria against information in, for example, a Provisioning Rules Table.

In an alternative embodiment the node, or gateway, scans the communication routes to which it can connect for availability and selects the preferred communication route according to availability. In this way the gateway can be optimised to use the best communication route.

In order to operate within the functionally virtualised home gateway arrangement comprising the two units of gateway, or node, and controller, the gateway is arranged to receive any of data control and management signals from the controller and transmit them into the first network. When the gateway uses the second communication route to reconnect the virtual gateway after failure of the primary connection route the gateway is also able to receive any of data control and management signalling via the second communication route.

The invention also relates to a system for performing gateway functions between a first network and a second network comprising a node arranged as an access point between the first network and the second network, a controller situated in the second network, and in which the node and controller are arranged to couple via a first communication route. The node is arranged to access a second communication route and is also arranged to couple to the controller via the second communication route when the first communication route suffers connection failure.

The system is particularly suitable for use with a node as previously described.

In a further advantageous embodiment the second network is coupled to a third network and further wherein the second communication route is arranged to route communication via the third network. The third network is typically the internet but could also be a mobile telecommunications network.

In a particularly advantageous embodiment the controller is arranged to perform any of data, control and management functions for the first network and is further arranged to perform any of data, control and management signalling via the second communication route when the first communication route suffers connection failure. Correspondingly the node is arranged to receive any of data, control and management signalling via the second communication route.

The system can further be arranged to set up a backup WAN channel, which in a particular embodiment is a data and control channel, via the second communication route.

The invention also relates to a method of maintaining connection between a node and a controller when the controller is situated in a second network and where the node and controller couple via a first communication route where the node can access a second communication route. In the method the node couples to the controller via the second communication route when the first communication route suffers connection failure. The node, which is typically a gateway device but can also be a computer, a mobile device or handset, is typically situated in a network attached to the second network, which may be an operator network, for example a home or domestic network, and can access at least both the first and second communication routes. If the first communication route suffers connection failure the method allows the node to reconnect, or recouple, to the controller via the second route and thereby maintain connection with the controller.

The method is suitable for use by a node as previously described.

The features as described allow control to be maintained in a virtualised, or distributed, home gateway. Further embodiments allow a choice to be made between backup WAN links when more than one potential communication link is available on the BRG or node, or when different BRGs are equipped with different backup possibilities. In particular it assists with decision making between potential backup links when each of is based on a different technology and/or needs different provisioning regarding AAA protocols etc. Features described also allow the BRG to be prepared for switching to the chosen backup link once the choice of backup link has been made. Further, features described show how, once a backup link is chosen, the BRG be directed towards the matching vHGW instance in the operator network, instead of towards the Internet.

The following technical measures are useful to implement the described features.

The WAN Control Failover Broker (WCFB) holds the knowledge of all backup alternatives regarding provisioning the gateway, or node, to switch over to the backup channel, typically assisted by a Provisioning Rules Table. With the help of the WCFB, the selection of backup channel can be gateway implementation agnostic which is to say a gateway can have arbitrary types and an arbitrary number of backup links configured but it is up to the WCFB to select the optimal alternative backup link and provision the gateway to use this link.

If a 3G/4G dongle is used it is provisioned on the gateway, or node, with the Access Point Name (APN) that points to the IP core of a second network, an operator, or service provider, operating the virtual home gateway. Even though gateways are layer-2 devices in the data plane they usually have a TCP/IP stack so that they can obtain an IP address, for example for management purposes. If not, the dongle may itself support a TCP/IP stack. The backup WAN IP can be obtained via GGSN/P-GW (PDN-GW) of a mobile telecommunications network. Before assigning the IP address, the P-GW first authenticates the gateway, for example by means of the SIM in the dongle or by another means of identifying the gateway. A layer-2 over layer-3 tunnel can then be applied between the gateway and the vHGW using a protocol such as L2TP or GRE. As the tunnel is set up between the gateway and the WAN-side of the vHGW, the vHGW should be configured such that it applies its LAN-sides services to the incoming tunnel. Possibly, the vHGW has a specific IP address on its WAN-side reserved for accepting incoming tunnels, besides the regular WAN-IP addresses it has for regular connectivity to the Internet or other services. In the case when the P-GW does not have the functionality to authenticate the gateway, the vHGW has to perform authentication when the tunnel is set-up, possibly via an AAA server in the operator's network. In this way the established backup connection can be directed to reach the controller, otherwise known as the vHGW instance, in the second network.

If a hotspot is used as the WAN backup link, in other words the WCFB has chosen to use the hotspot as backup WAN, then the WCFB activates the client bridge/repeater mode of the AP on the gateway, or node.

In a particular embodiment the hotspot can be a FON hotspot, or other hotspot operated according to the FON protocol.

The client bridge/repeater on the node, or gateway, finds the public SSID broadcasted from the hotspot or from a neighbouring gateway/controller combination. This latter example might occur in the case of FON, for example. The WCFB instructs the gateway to connect to this SSID using a pre-assigned FON or hotspot credential. By doing so a gateway that has lost the primary WAN connection will obtain a WAN IP from WLAN-GW (DHCP) in the second, or operator's network, and a layer-2 over layer-3 tunnel can again be applied. In the case when the WLAN-GW does not have the functionality to authenticate the gateway, the vHGW has to perform authentication when the tunnel is set-up, possibly via an AAA server in the operator's network.

Further embodiments and aspects of the invention are shown in the following figures.

FIGURES

FIG. 1 shows an arrangement for providing gateway services to a home environment.

Figure 2:
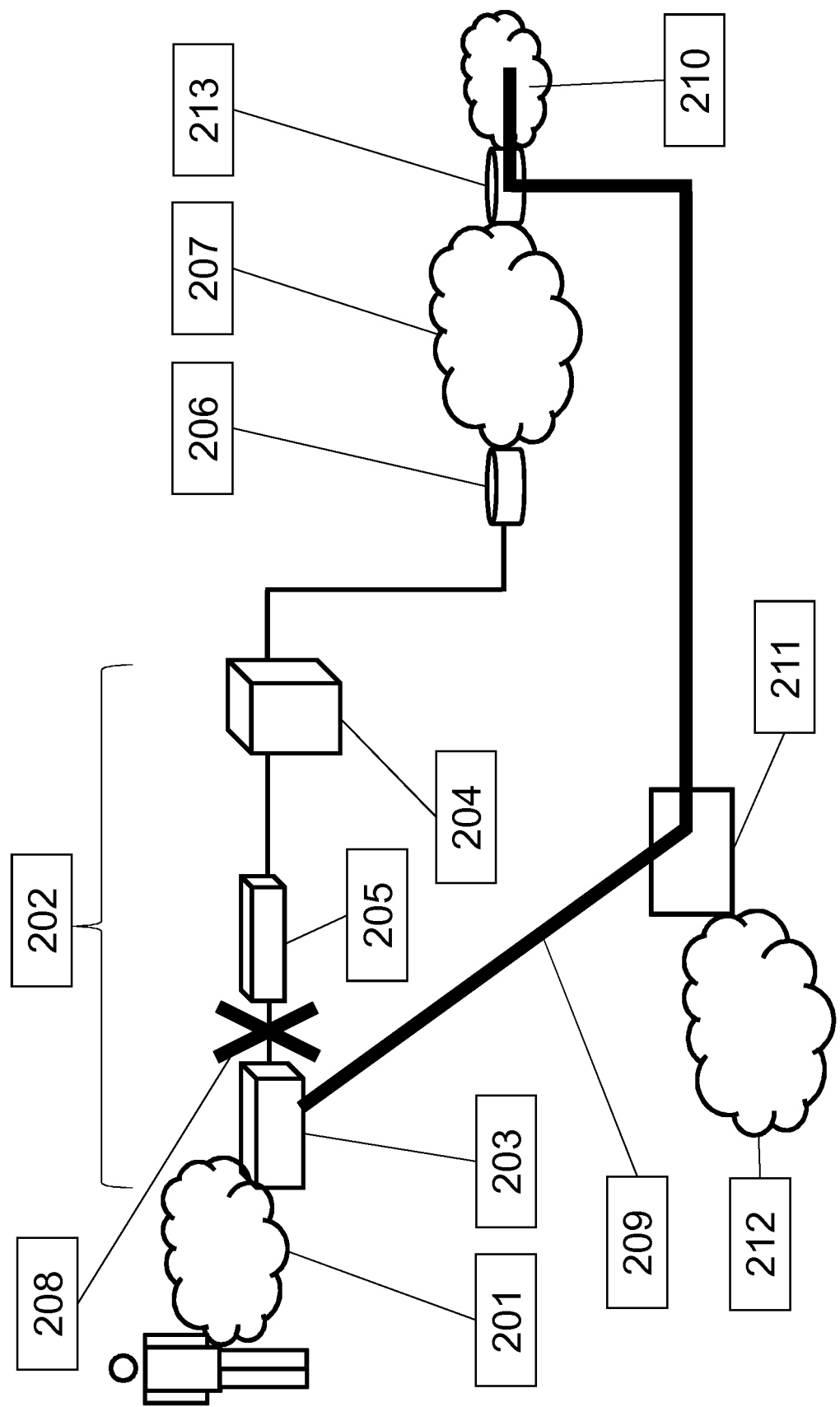
Figure 3:
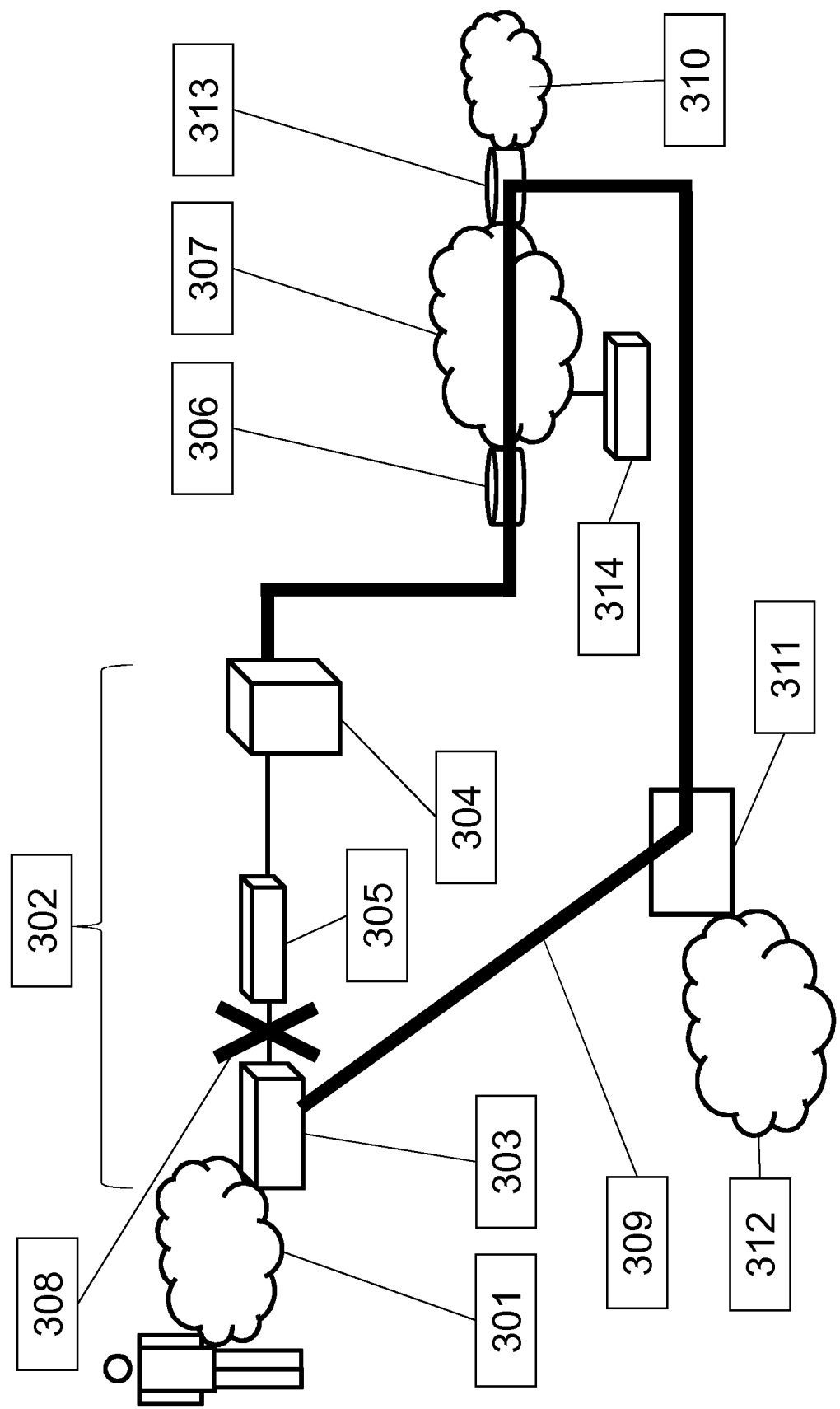
Figure 4:
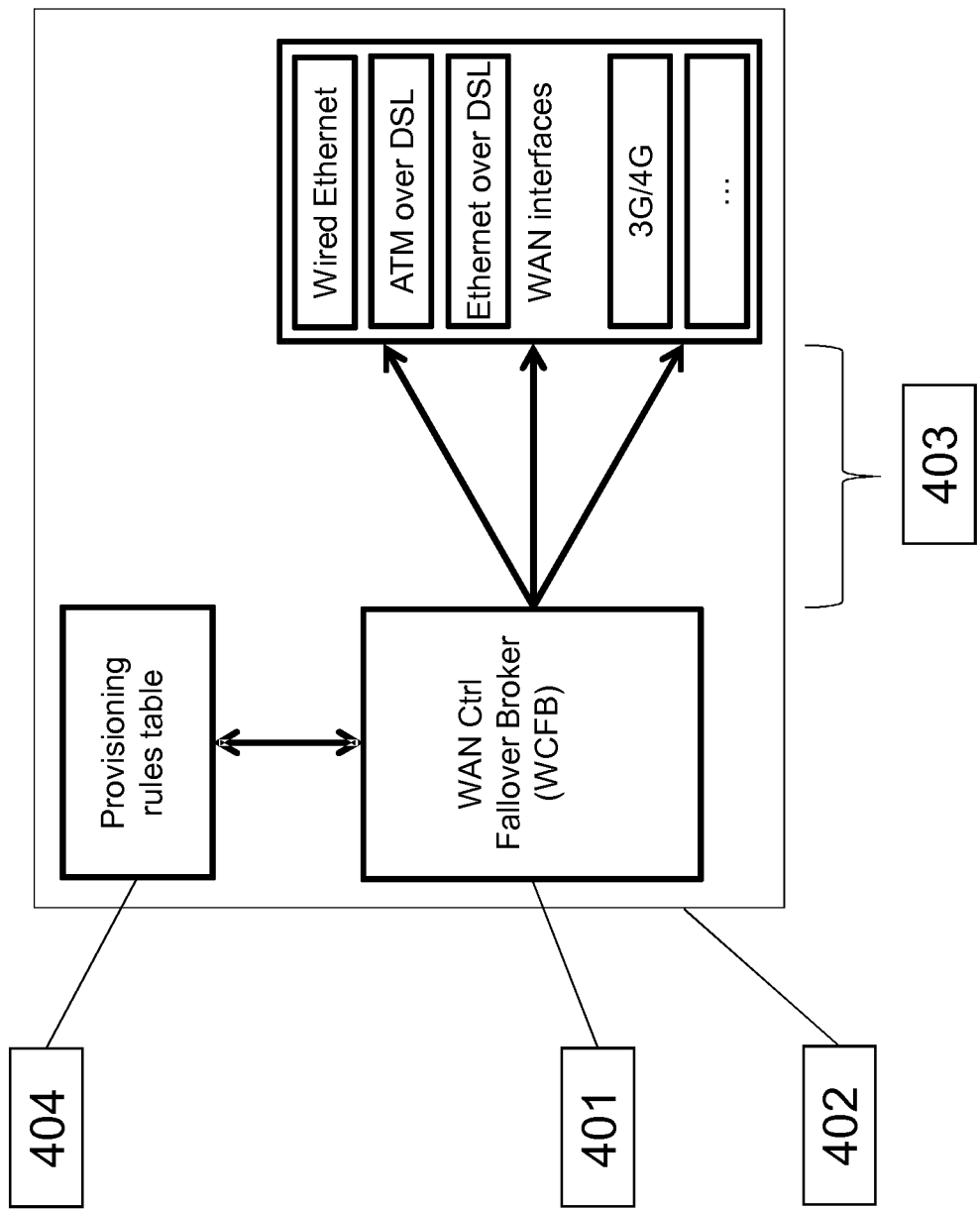
Figure 5:
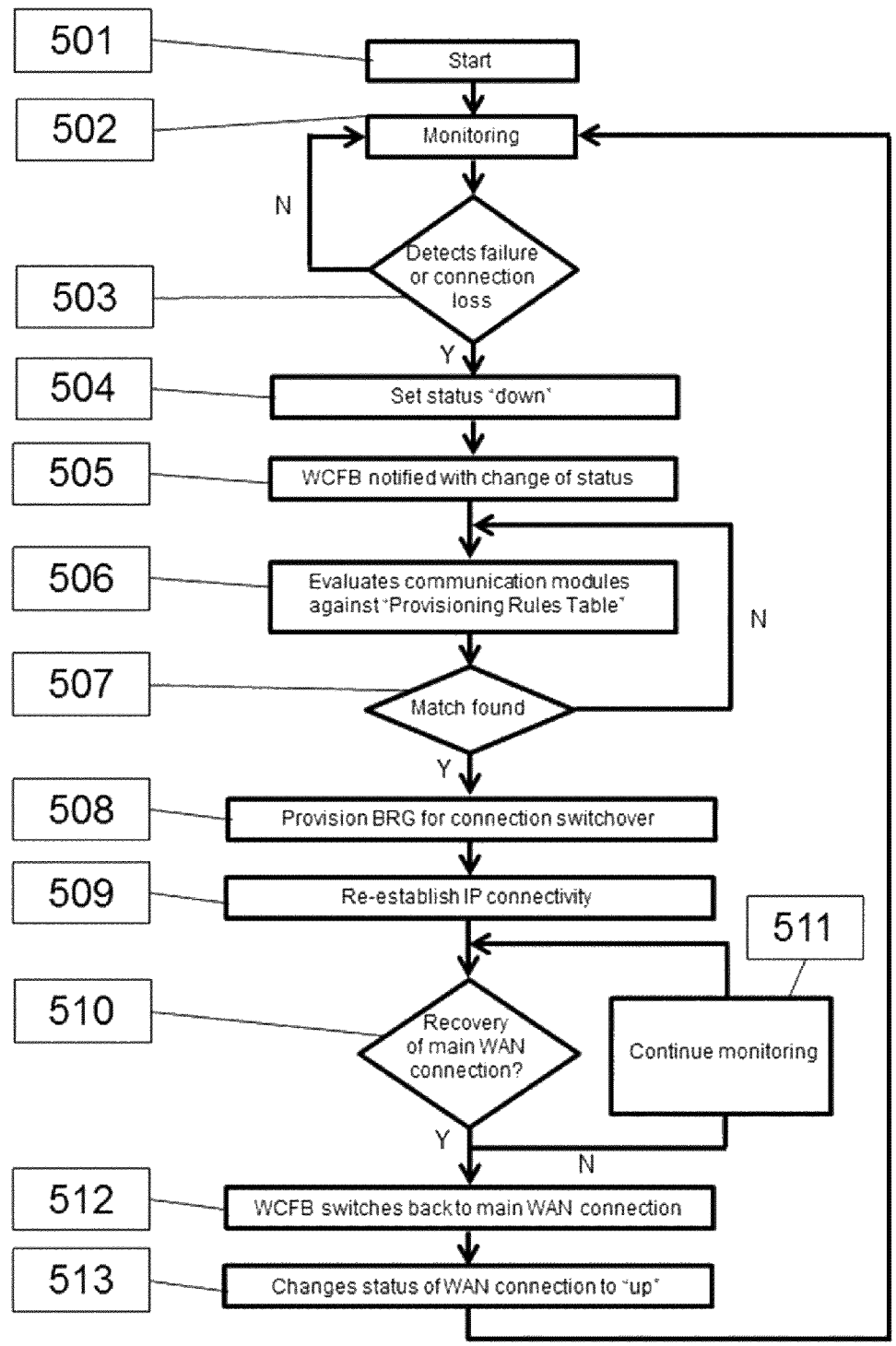
Figure 6:
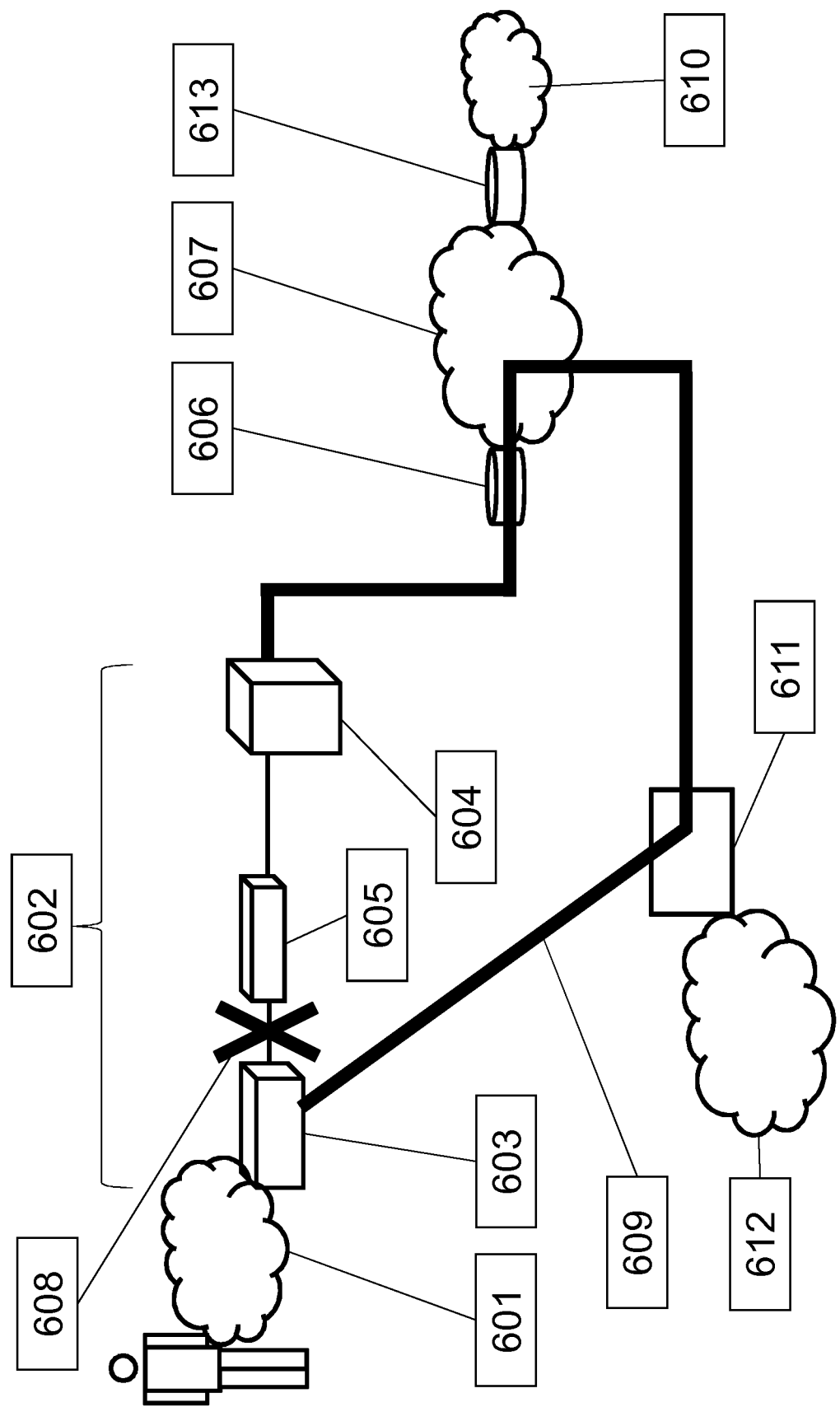
Figure 7:
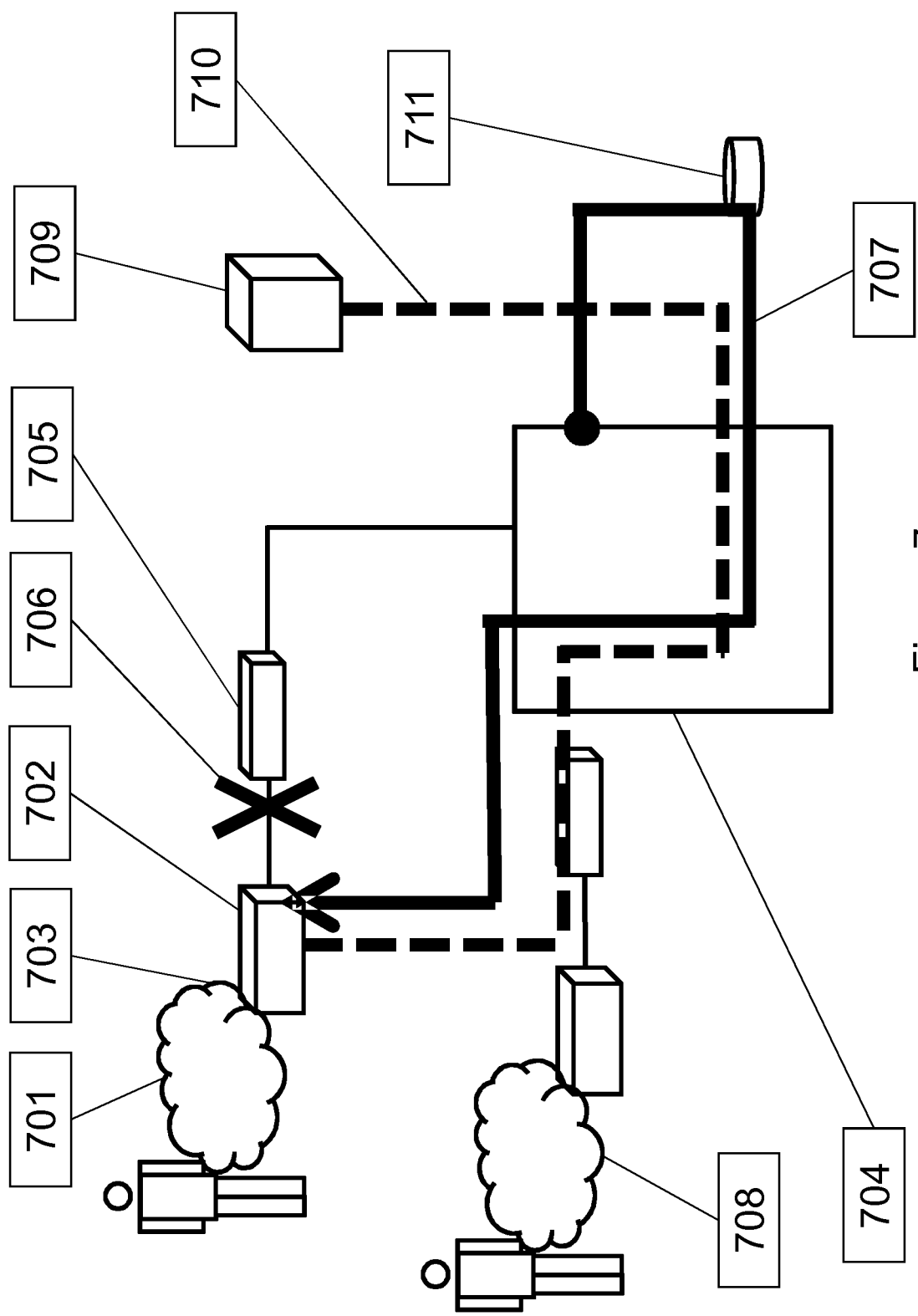

FIG. 2 shows a problem of the prior art.
FIG. 3 shows an embodiment according to the invention.
FIG. 4 shows an agent or module which can be used for an embodiment of the invention.
FIG. 5 shows an embodiment of the invention.
FIG. 6 shows an embodiment of the invention.
FIG. 7 shows an embodiment of the invention.

DETAILED DESCRIPTION

FIG. 1 shows an arrangement for providing gateway services to a home environment. A home, or domestic domain, 101 is serviced by a distributed home gateway arrangement 102 which is functionally equivalent to a conventional HGW split into a bridge component (BRG) 103, node, at home and a corresponding virtual HGW instance (vHGW) 104, or controller, located in the operator network. As is known in the art bridge 103 and vHGW 104 are connected by a network switch, DSLAM or other connecting unit 105 which typically connects up the home network to the operator network. In the embodiment shown the vHGW 104 connects at a BRAS 106 of an operator network 107.

Arrow 108 shows the direction of virtual HGW functions serving the BRG 103 in the home domain 101. Arrow 108 is also typically the direction in which other data flows, for example TV programs and downloads, would travel into the home domain 101 via the distributed home gateway arrangement 102.

Typically the vHGW 104 is hosted on an Area Point of Presence (APOP) and serves the BRG 103 via a DSL/Ethernet WAN connection. Home domain 101 depends on this connection to obtain various services 109, including for example DHCP, DNS, Firewalling, LAN Topology discovery, LAN device management etc. from the vHGW 104 and which as services are hosted on the vHGW.

FIG. 2 shows a problem of the prior art. Here the home domain 201 is serviced by a distributed home gateway arrangement 202 comprising a bridge component 203 at home and a corresponding virtual HGW 204 located in the operator network. Bridge 203 and vHGW 204 are connected by a network switch, DSLAM or other connecting unit 105 which typically connects up the home network to the operator network. The vHGW 204 also connects to a BRAS 206 of an operator network 207.

When the broadband connection between bridge 203 and vHGW 204 breaks down 208, the bridge 203 switches to a backup WAN connection 209 to reach Internet 210. Backup connection 209 routes connection of the bridge 203 via the P-GW 211 of 4G WAN backup solution 212 to an Internet router 213. The backup WAN IP 209 obtained by the bridge 203 from the P-GW 211 can redirect user data relevant to home domain 201 to and from the Internet 210. As would be understood by the skilled person, the APN configured on the 4G dongle points to Internet 210 as its PDN. The actual end point of the connection 209 will depend on the source of whichever data stream is transmitted to the home domain 201 via the new connection 209. This arrangement maintains a route for maintaining of streaming and downloading of data from the internet. However, an extra problem occurs with the breakdown 208 of the broadband connection. Because this break down also severs the link between bridge 203 and vHGW 204 any communication normally occurring between the two is prevented from occurring and valuable services, for example DHCP, DNS, Firewalling, LAN Topology discovery and LAN device management etc. all fail within the distributed home gateway. In fact all services hosted on the vHGW 204 as virtual functions (VFs) will fail.

FIG. 3 shows an embodiment of the invention. Home domain 301 is serviced by a distributed home gateway arrangement 302 comprising a gateway 303, or node, typically situated in the home served by network 301 and sometimes referred to as a bridge, simplified bridge or bridge component, and a corresponding controller 304 located in the operator network. In an embodiment the gateway 303, or node, is a stand-alone device located at the periphery of the home domain 301, but can also be an application on a device in the network, for example a computer. In particular the gateway 303 can also be a handheld device, for example a mobile phone, tablet or other device.

Controller 304 can also be referred to as a virtual HGW. Gateway 303 and controller 304 are typically in practice connected by a network switch, DSLAM or other connecting unit 105 which typically connects up the home network to the operator network, although the actual form of communicative connection or coupling will depend on the technology and form underlying the operator network. In FIG. 3 controller 304 connects to a BRAS 306 of an operator network 307.

When the broadband connection between gateway 303 and controller 304 breaks down 308, the gateway 303 switches to a backup WAN connection 309 to reach controller 304. Backup connection 309 routes connection 309 via, in this case, a P-GW 311 of 4G WAN backup solution 312 directly to the controller 304 via an Internet router 313, or directly to the BRAS 306 itself. The controller 304 is in this sense the end point of the connection 309 from the gateway 303.

Gateway 303 may comprise a monitoring module which monitors the connection state of the primary WAN and informs gateway 303 once the connection state is down 308. Gateway 303 detects WAN connection failure 308 by detecting the loss of Physical (PHY) layer Sync (ISAM/ASAM) or by detecting loss of L3 Sync (PPP connection failure). In a further embodiment the monitor module can also monitor the alternative communication modules on the gateway and transmit the results to the WCFB as input for evaluation against any selection criteria regarding the choice of which communication channel to use as a backup.

In a further embodiment the P-GW 311 can direct gateway 303 to the Internet router 313, or directly to the BRAS 306 in the operator's IP core. In this way, the gateway 303 performs as a user entity UE, such as a regular mobile phone, in the 4G network which specifies the Access Network Name (APN) to connect to the appointed P-GW 311. The respective P-GW 311 assigns the WAN management IP address to the gateway 303. This WAN IP can fall in the subnet to which the BRAS 306 belongs. Before assigning the IP address, the P-GW 311 first authenticates the gateway 303, e.g. by means of the SIM in the dongle, or by another means of identifying the gateway 303.

In a further embodiment the backup WAN IP address obtained by gateway 303 from the P-GW 311 can be used to set up a layer-2 over layer-3 tunnel 309, not only to redirect user data relevant, for example television programs and downloads, from controller 304 to home domain 301, but also allows reconnection of the distributed home gateway arrangement 302 by allowing a direct communication channel between gateway 303 and controller 304.

In a further embodiment as the tunnel 309 is set up between the gateway 303 and the WAN-side of the vHGW 304, the vHGW 304 should be especially configured such that it applies its LAN-sides services to the incoming tunnel 309. Possibly, the vHGW 304 has a specific IP address on its WAN-side reserved for accepting incoming tunnels, besides the regular WAN-IP addresses it has for regular connectivity to the Internet 301 or other services. In a further embodiment in the case when the P-GW 311 does not have the functionality to authenticate the gateway 303, the vHGW 304 has to perform authentication when the tunnel is set-up, possibly via an AAA server 314 in the operator's network 307.

The invention as discussed provides a means for rendering the vHGW 304 reachable by the BRG 303, first on the IP level, and then on layer-2, upon detection of the primary WAN connection failure 308. This allows rerouting of, for example any of data, control and management signalling from within the operator's network between the BRG 303 and the vHGW instance 304 via a backup channel 309.

In this way, connection 309 forms the WAN backup channel with which the controller 304 can continue providing any of data, control and/or management services to the gateway 303 and hence the various home network apparatus in home domain 301.

In further embodiments various backup channel alternatives exist including 3G, 4G communication channels, and alternatively publically available Wi-Fi access can be used, for example Hotspot2.0.

FIG. 4 shows aspects of a WAN Control Failover Broker (WCFB) 401, which can be used for an embodiment of the invention. The WAN Control Failover Broker resides on the gateway 402 and examines 403 all possible backup alternatives present on the gateway, and prepares and/or provisions the gateway for the switch-over from the primary communication channel to the secondary communication channel when the primary communication channel fails.

The availability of WCFB 401 also means that the different gateways do not have to be identical regarding alternative backup WAN types, because the WCFB 401 will provision its own gateway according to the best or most suitable backup WAN available.

In an embodiment the WCFB performs the following:
(1) it receives the main WAN connection failure notification from the gateway;
(2) upon reception of the notification it scans the available backup connectivity 403 and selects the preferred option according to some user- or service-provider-configurable rules;
(3) it performs necessary provisioning for the selected backup WAN channel. Here a table of provisioning rules 404 may be referred to by the WCFB 401. The table can be either local, i.e. on the gateway as either a module or a virtual function installed on the gateway, as shown in FIG. 4, or be remote. The Provisioning rules table 404 can be generated by the controller and stored on the gateway at initial set up or can be reinstalled at each start-up. The latter embodiment allows for a provisioning table which is kept updated with new information as it becomes available.
(4) it executes the backup WAN switch-over.

Table 1 shows examples of criteria which can be used in embodiments of the invention, and in particular it shows information that may be included in a provisioning rules table as used by the gateway, or by the WCFB attached to or residing in the gateway. Any or all of the alternative backup channels may be available to the gateway and the Provisioning Rule Table, or other device or data store arrangement includes selection criteria which the gateway uses to decide whether or not to use a particular communication method. Once the gateway has chosen a particular communication channel as backup channel the gateway performs the actions for provisioning for that particular communication channel. Other alternatives and arrangements are possible.

| Alternative backup channel | Selection Criteria | Actions for provisioning |
|---|---|---|
| 3G/4G | 1. Status WAN is "down" (PHY or PPP lost)<br>2. Dongle detectable<br>3. Access Point Name (APN) present. This is NOT the regular APN pointing to the Internet, but a special APN, preprovisioned by the Service Provider, pointing to the vHGW. | 1. Switch-over module triggers 3G/4G dongle<br>2. connects to P-GW using the APN<br>3. re-establish IP connectivity with vHGW instance |
| 3G/4G alternative | 1. Status WAN is "down" (PHY or PPP lost)<br>2. Dongle detectable<br>3. Access Point Name (APN) present in MME. This is NOT the regular APN pointing to the Internet, but a special APN, preprovisioned by the Service Provider, pointing to the vHGW. | 1. Switch-over module triggers 3G/4G dongle<br>2. MME discovers that it is a BRG that tries to connect ot the 3G/4G network. The MME tells the P-GW which APN to connect to.<br>3. Connects to P-GW using the APN<br>4. re-establish IP connectivity with vHGW instance |
| Public Wi-Fi (FON) | 1. Status WAN is "down" (PHY or PPP lost)<br>2. Wi-Fi module can be either put in repeater mode or WDS mode<br>3. FON or other hotspot credentials present | 1. Switch-over module converts Wi-Fi from AP mode to alternative mode, be it the repeater mode or WDS (wireless distribution system) mode<br>2. connects to adjacent FON or hotspot network<br>3. re-establish IP connectivity with vHGW instance |
| Use mobile phone in the house as backup access | 1. Status WAN is "down" (PHY or PPP lost)<br>2. Authorized phone in the home network present<br>3. Phone has cost-effective 3G/4G connectivity and can be put in tethering mode | 1. Switch-over module converts Wi-Fi from AP mode to alternative mode, be it the repeater mode or WDS (wireless distribution system) mode<br>2. User programs the correct APN (special APN pointing to the vHGW) in his phone and connects the BRG to the 3G/4G network OR user runs an App doing so automatically. The App may also check connectivity of BRG regularly and on WAN "down" performs the whole handover mechanism automatically |

FIG. 5 shows an embodiment of the invention. A flow-diagram shows procedures for WAN control Failover Broker reacting to the failure of the primary WAN. The method starts 501 with functioning primary WAN.

The monitoring module on the gateway monitors 502 the WAN connection and if it detects PHY failure or PPP connection loss for the primary WAN interface 503 it sets the status of the WAN connection as "down"504. The WCFB is notified with a change of status 505. The WCFB scans on and evaluates the next backup communication module against the criteria in the "Provisioning Rules Table" 506 until a match is found 507. A match will typically be a match between a backup candidate and an entry in the "Provisioning Rules Table".

When a match is found the gateway, or BRG, is provisioned 508 for connection switchover and IP connectivity is re-established, in a further particular embodiment a layer-2 over layer-3 tunnel 509 with the controller, or vHGW, using the controller's previously noted IP address and via the newly established connection pathway.

Meanwhile the monitoring module continues to monitor the main, or primary, WAN connection 510 for recovery, doing nothing if no re-establishment of the primary connection is detected 511.

When recovery of the main connection is detected 512 the WCFB switches back to the main WAN connection and the status of the WAN connection is changed to "up" 513.

FIG. 6 shows an embodiment of the invention when 4G backup is used as a second communication route to reinstate contact between a gateway 603 and controller 604, forming between them a distributed home gateway arrangement 602, and where gateway 603 is in a home domain 601. Gateway 603 is sometimes referred to as a bridge, simplified bridge or bridge component. Corresponding controller 604 located in the operator network and can also be referred to as a virtual HGW. Gateway 603 and controller 604 are typically in practice connected by a network terminal unit 605, although this is not necessary and the actual form of communicative connection or coupling will depend on the technology and form underlying the operator network. In the embodiment shown controller 604 connects to a BRAS 606 of an operator network 607.

When the broadband connection between gateway 603 and controller 604 breaks down 608 the gateway 603 switches to a backup connection 609 (in bold) to reach controller 604.

Backup connection 609 shows the reconstructed control channel between the gateway-controller pair on the IP level.

Backup connection 609 is routed via a P-GW 611 of 4G network 612 WAN backup solution directly to the controller 604 via the BRAS 606. Backup route 609 connects gateway 603 to the controller 604 via an IP core 607 of the operator network and not via an internet router 613 or the wider Internet 610.

The controller 604 is in this sense the end point of the connection 609 from the gateway 603. The P-GW 611 can direct gateway 603 to the BRAS 606 in the operator's IP core. In this way, the gateway 603 performs as a user entity UE, typically a mobile phone for example, in the 4G network which specifies the Access Network Name (APN) to connect to the appointed P-GW 611. The respective P-GW 611 interfaces with the operator's IP core and assigns the WAN management IP address to the gateway 603. This WAN IP can fall in the subnet to which the BRAS 606 belongs. In this way, connection 609 forms the WAN backup control channel with which the controller 604 can continue providing control and/or management services to the gateway 603 and hence the various home network apparatus in home domain 601.

In a further embodiment it is also possible to use 3G backup.

FIG. 7 shows an embodiment of the invention when Wi-Fi is used as a second communication route to reinstate contact between the gateway and controller. Wi-Fi may be used via a publically available Wi-Fi, for example via the FON set of protocols or some other Wi-Fi hotspot protocol.

A home domain 701 is serviced by a distributed home gateway arrangement 702 comprising a gateway 703, typically situated in the home served by network 701 and sometimes referred to as a bridge, simplified bridge or bridge component, and a corresponding controller 704 located in the operator network and which can also be referred to as a virtual HGW. Gateway 703 and controller 704 are typically in practice connected by a network switch, DSLAM or other connecting unit 705 which typically connects up the home network to the operator network.

Upon failure 706 of the broadband connection between gateway 703 and controller 704 the gateway 703 switches to a backup WAN connection 707 to reach controller 704. Backup connection 707 (shown in bold) routes the reconstructed data and control channel between, in this case, the gateway-controller pair via a Wi-Fi connection used by another domain 708.

In this deployment scenario, the gateway 703 can be provisioned in such a way that its Wi-Fi AP automatically switches to client bridge mode (or repeater mode, depending on different requirements) when it detects the loss of WAN DSL/Ethernet connection. With pre-installed hotspot credentials the gateway 703 can connect to a neighbour Public Wi-Fi network 708. From there, normal hotspot procedures can be followed for the gateway 703 to obtain a private IP address from the Wireless LAN Gateway (WLAN-GW) 709 on the GRE (Generic Routing Encapsulation) tunnel 710. As a result, IP connectivity becomes available again among the gateway 703 and the controller or vHGW instance 704. A layer-2 over layer-3 tunnel 707 can then be applied between the gateway 703 and the vHGW 704 using a protocol such as L2TP or GRE. As the tunnel 707 is set up between the gateway and the WAN-side of the vHGW 704, the vHGW should be especially configured such that it applies its LAN-sides services to the incoming tunnel 707. In case the WLAN-GW 709 does not have the functionality to authenticate the gateway 703 not only for the hotspot network, but also for the vHGW operator network, the vHGW has to do itself when the tunnel is set-up, possibly via an AAA server 711 in the operator's network. Via this tunnel, VFs installed on the controller 704 can again serve the home network.

The invention claimed is:

1. A node for communication between a first network and a second network and wherein the node is arranged to couple to a controller in the second network via a first communication route for forming a distributed gateway, wherein the controller performs virtualized gateway functions for the node, and wherein:
the second network is an internet service provider operating the controller,
the node is arranged to access a second communication route, and
the node is arranged to couple to the controller via the second communication route for forming the distributed gateway upon connection failure of the first communication route.

2. A node according to claim 1 wherein the node is arranged to detect connection failure of the first communication route, and is further arranged to execute switchover to the second communication route.

3. A node according to claim 1 wherein the node is arranged to request an IP address for communicating with the controller in the second network.

4. A node according to claim 1 wherein the node comprises an agent to detect connection failure of the first communication route and execute switchover to the second communication route.

5. A node according to claim 1 wherein the node comprises a module to detect connection failure of the first communication route and execute switchover to the second communication route.

6. A node according to claim 1 wherein the node is arranged to access further communication routes and is further arranged to select a preferred communication route as second communication route.

7. A node according to claim 6 wherein the node is arranged to select a preferred communication route according to predetermined rules.

8. A node according to claim 7 wherein the predetermined rules are comprised in a provisioning rules table.

9. A node according to claim 6 wherein the node is arranged to scan the further communication routes for availability and is further arranged to select the preferred communication route according to availability.

10. A node according to claim 1 wherein the node is arranged to receive any of data, control and management signals from the controller and transmit them to the first network and wherein the node is further arranged to receive any of data, control and management signalling via the second communication route upon connection failure of the first communication route.

11. A system for performing gateway functions between a first network and a second network and comprising:

a node arranged as an access point between the first network and the second network; and a controller situated in the second network; and wherein the second network is an internet service provider operating the controller, the node and the controller are arranged to couple via a first communication route for forming a distributed gateway, wherein the controller performs virtualized gateway functions for the node, the node is arranged to access a second communication route, and the node is arranged to couple to the controller via the second communication route for forming the distributed gateway when the first communication route suffers connection failure.

12. A system according to claim 11 and wherein the second network is coupled to a third network and further wherein the second communication route is arranged to route communication via the third network.

13. A system according to claim 11 wherein the controller is arranged to perform any of data, control and management functions for the first network and wherein the controller is further arranged to perform any of data, control and management signalling via the second communication route when the first communication route suffers connection failure.

14. A system according to claim 11 wherein the system is arranged to set up a backup WAN channel via the second communication route.

15. A method of maintaining connection between a node and a controller which is situated in a second network, the second network being an internet service provider operating the controller, the node and the controller arranged to couple via a first communication route for forming a distributed gateway, wherein the controller performs virtualized gateway functions for the node, and the node further arranged to access a second communication route; wherein the node couples to the controller via the second communication route for forming the distributed gateway when the first communication route suffers connection failure.

* * * * *